(12) United States Patent
Castle et al.

(10) Patent No.: US 8,852,484 B2
(45) Date of Patent: Oct. 7, 2014

(54) BEAD-FORMING APPARATUS

(75) Inventors: Eden Castle, Bath, PA (US); Jennifer Kozlowski, Easton, PA (US)

(73) Assignee: Crayola LLC, Easton, PA (US)

(*) Notice: Subject to any disclaimer, the term of this patent is extended or adjusted under 35 U.S.C. 154(b) by 219 days.

(21) Appl. No.: 13/399,559

(22) Filed: Feb. 17, 2012

(65) Prior Publication Data

US 2012/0211920 A1  Aug. 23, 2012

Related U.S. Application Data (60) Provisional application No. 61/444,355, filed on Feb. 18, 2011.

(51) Int. Cl.
*B29C 43/04* (2006.01)
*B29C 43/02* (2006.01)

(52) U.S. Cl.
CPC .................................. *B29C 43/021* (2013.01)
USPC ............ 264/310; 425/332; 425/333; 425/394

(58) Field of Classification Search
CPC ..... A21C 11/00; B29C 43/04; B29C 67/0003
USPC ........................... 264/310; 425/322, 333, 394
See application file for complete search history.

(56) References Cited

U.S. PATENT DOCUMENTS

| 240,966 | A |   | 5/1881 | Chappell |
| 431,454 | A |   | 7/1890 | Dyke |
| 471,243 | A |   | 3/1892 | Mishler |
| 1,094,966 | A | * | 4/1914 | Barker .......................... 425/333 |
| 2,332,361 | A | * | 10/1943 | Anastor et al. .................. 65/143 |
| 2,867,000 | A |   | 1/1959 | Huszar |
| 3,713,187 | A | * | 1/1973 | Quartarone et al. .......... 426/513 |
| 4,946,359 | A |   | 8/1990 | Christen |
| 6,224,365 | B1 |   | 5/2001 | Ou-Young |
| 2004/0212117 | A1 |   | 10/2004 | Lee |

* cited by examiner

*Primary Examiner* — James Sanders
(74) *Attorney, Agent, or Firm* — Shook, Hardy & Bacon L.L.P.

(57) ABSTRACT

A bead-forming apparatus and method for its use are described. The bead-forming apparatus includes a base with a pair of legs extending from a top surface. First ends of the legs couple to respective eccentric elements. The eccentric elements removeably and rotatably couple to a platen. Second ends of the legs are rotatably and slideably mated with a gear train disposed within the base. The legs are slideably translatable into the base and the gear train maintains a rotational orientation of the legs and the eccentric elements coupled thereto. The platen is thus moveable through a circular path defined by the rotation of the eccentric elements and legs. As such, a plug of moldable material placed between the base and the platen and in contact with the platen, is formed into a double-cone shape by movement of the platen through the circular path.

20 Claims, 8 Drawing Sheets

BEAD-FORMING APPARATUS

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

Embodiments of the invention include apparatus and methods for making beads from moldable materials such as modeling clay. A bead-forming apparatus is provided that includes an upper platen and a stationary base coupled via a pair of eccentric elements. A portion of one or more modeling materials are pressed together to form a generally spherical form and the materials are placed between the base and upper platen. The upper platen is pressed toward the base to contact the modeling material and is moved through a circular path defined by rotation of the eccentric elements; the circular path is larger in diameter than the upper platen. As such, the portion of modeling material is formed into a double cone shape and the modeling materials are swirled together.

DESCRIPTION OF THE DRAWINGS

Illustrative embodiments of the invention are described in detail below with reference to the attached drawing figures, and wherein.

DETAILED DESCRIPTION

The subject matter of embodiments of the invention is described with specificity herein to meet statutory requirements. But the description itself is not intended to necessarily limit the scope of claims. Rather, the claimed subject matter might be embodied in other ways to include different steps, components, or combinations thereof in conjunction with other present or future technologies. Terms should not be interpreted as implying any particular order among or between various steps herein disclosed unless and except when the order of individual steps is explicitly described.

The manufacture of beads for use as ornamentation and jewelry has been practiced since ancient times. Beads may be formed from moldable materials such as clay, glass, metals, plastics, and the like as well as non-moldable materials like gemstones. Many techniques are employed by bead makers to produce desired shapes or forms of beads. Techniques are also used to provide desired appearances to the beads, such as by layering, mixing, blending, or swirling together multiple constituent materials.

Embodiments of the invention provide apparatus and methods for producing beads from moldable materials. The materials include any modeling compounds or the like. For example, the materials might include flour-based doughs, rice-based doughs, earth clays, modeling clay, oil-based clays, and the like. In an embodiment, the materials are one or more of Dough, Air-Dry Clay, Modeling Clay, and Model Magic® available from Crayola LLC of Easton, Pa. The materials can be air-dry or kiln dry and can be reusable.

In an embodiment, the materials are sufficiently soft or malleable to be capable of forming by hand and with a bead-forming apparatus as described more fully below. The materials may require pre-working or softening prior to use. The materials also have sufficient viscosity to sufficiently retain a shape or form into which they have been formed.

The materials are provided in various colors and include any desired additives or other components to provide a desired physical property or appearance. In an embodiment, multiple separate materials are used; each having a different color or colors.

With reference to the figures, and to FIGS. 1-5 in particular, a bead-forming apparatus 100 is described in accordance with an embodiment of the invention. The components described below are constructed by manufacturing methods and from materials known in the art such as, for example, and not limitation, injection molded plastics. However, any desired manufacturing methods and materials may be used in embodiments of the invention without departing from the scope described herein.

The apparatus 100 includes a base 102, a pair of eccentric discs 104, and an upper platen 106. As depicted best by FIGS. 4 and 5, the base 102 includes a base plate 108 and a cover 110 with three gears 112, 114, and 116 disposed therebetween. The cover 110 includes a pair of apertures 117 to provide access to the gears 112 and 116, as described more fully below. The base plate 108 and/or the cover 110 also include one or more features extending from an interior surface thereof that form axles 118, 120, and 122 upon which the gears 112, 114, and 116 are disposed, respectively. The axles 118, 120, 122 are configured such that the gear 112 meshes with the gear 114 and the gear 116 also meshes with the gear 114. The gears 112, 114, and 116 are depicted herein as spur gears, however, any desired gear configuration and transmission design that produces the below described motion may be employed without departing from the scope of embodiments of the invention.

The gears 112 and 116 include a coaxially located projection 124 and an aperture 126 configured to accept a spring 128 and a leg 130. The projection 124 extends perpendicular to a side surface of the gears 112/116 a distance to allow sufficient travel of the leg 130, as described more fully below. The aperture 126 passes through the gear 112/116 and through the projection 124. The aperture 126 has a cylindrical cross-sectional shape throughout the majority of its length and has a polygonal cross-sectional shape at a terminating face 132 of the projection 124. In an embodiment, the cross-sectional shape is a square, however any desired shape might be employed. The polygonal cross-sectional shape is configured to accommodate a corresponding shape of the leg 130. The polygonal cross-sectional shape of the leg 130 and the aperture 126 allow the leg 130 to be slideably disposed therein and also rotationally couples the leg 130 and the gear 112/116 such that rotation of the leg 130 rotates the respective gear 112/116 and vice versa.

The leg 130 also includes an annular flange 134 near a first end 136 of the leg 130. The annular flange 134 is configured to fit within the aperture 126 but to interact with the polygonal cross-sectional shaped terminating face 132 of the projection 124 such that the leg 130 cannot be removed from the gear 112/116 through the terminating face 132. Additionally, a hollow 138 is provided in the first end 136 of the leg 130. The hollow 138 has sufficient dimensions to slideably accept the axle 118/122 therein.

Figure 5:
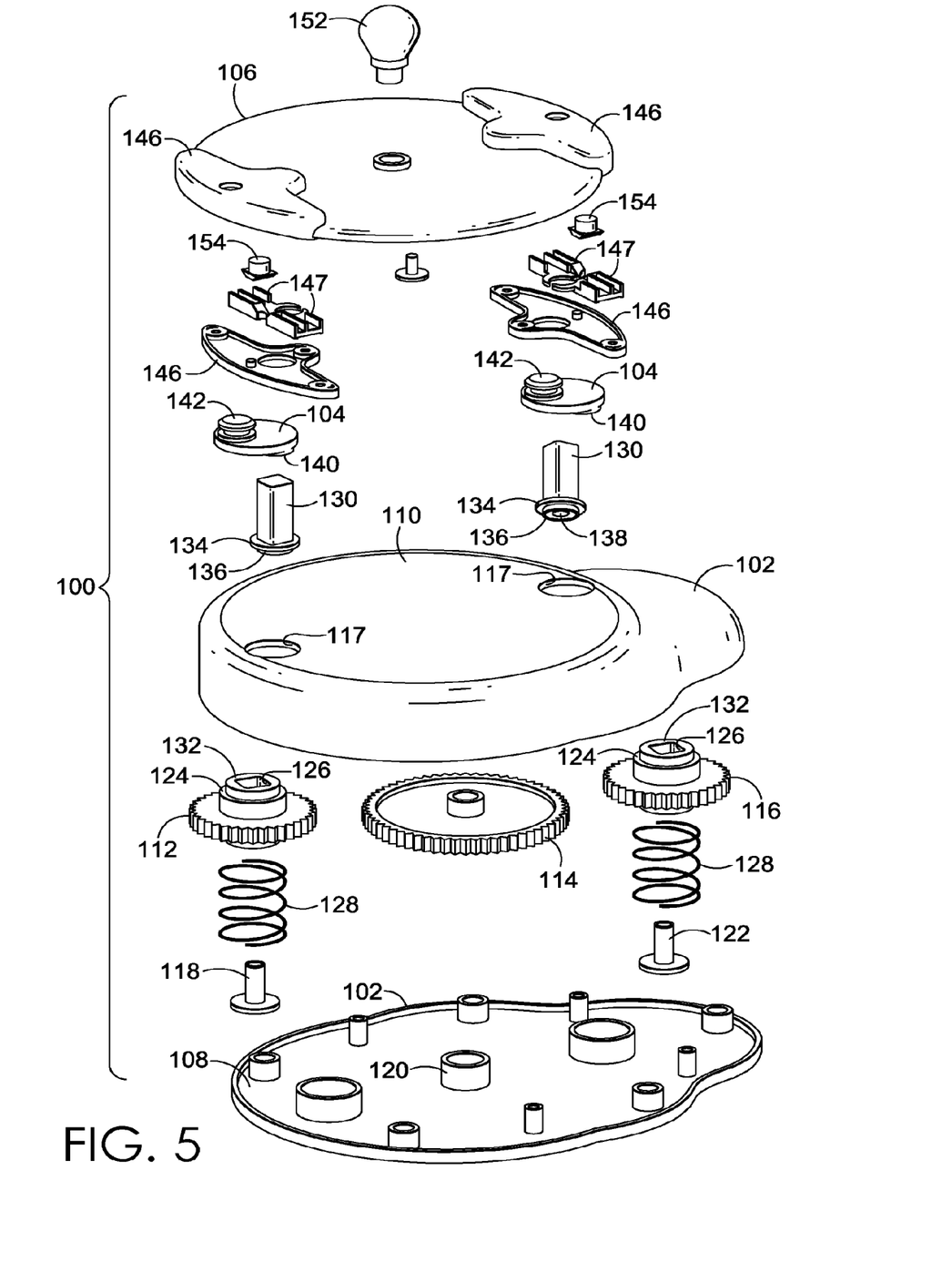
FIG. 5 is an exploded view of a bead-forming apparatus in accordance with an embodiment of the invention.
Figure 6A:
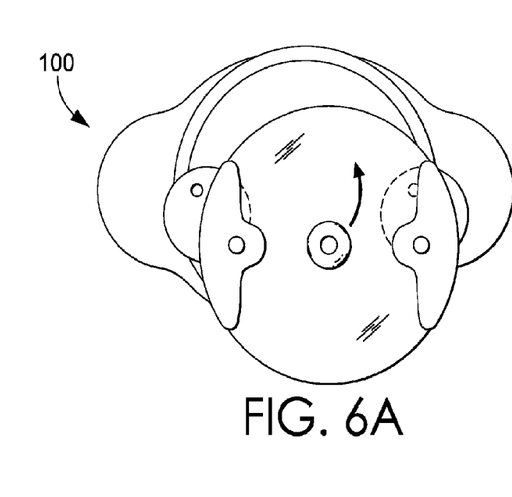
FIGS. 6A-6D are series of top plan views of the bead-forming apparatus depicted in FIG. 1 showing movement of a top platen along a circular path in accordance with an embodiment of the invention.
Figure 6B:
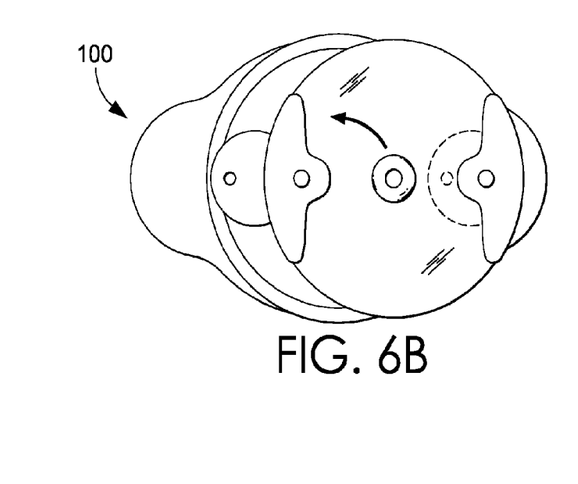
Figure 6C:
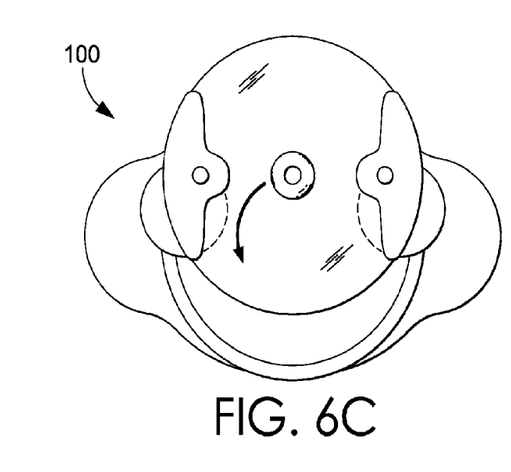
Figure 6D:
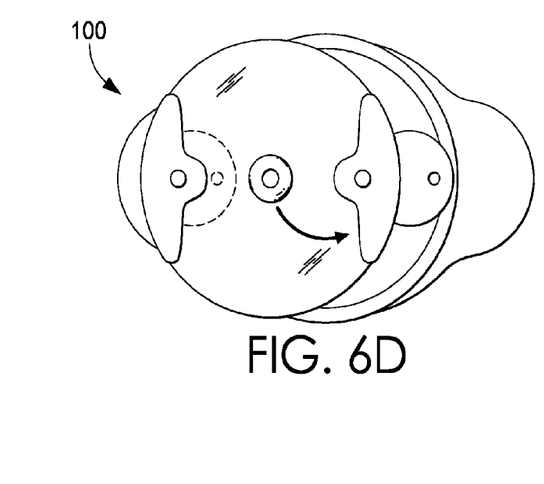
Figure 7A:
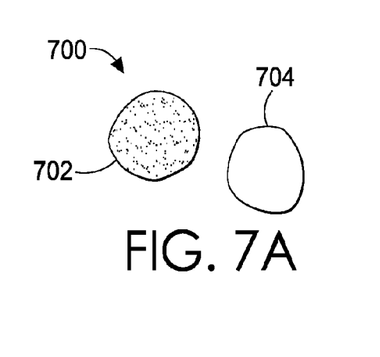
FIGS. 7A-7F are a series of views of modeling materials being prepared for use with the bead-forming apparatus depicted in FIG. 1 in accordance with an embodiment of the invention.
Figure 7B:
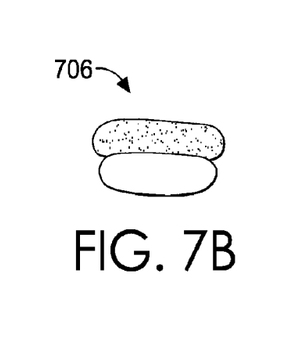
Figure 7C:
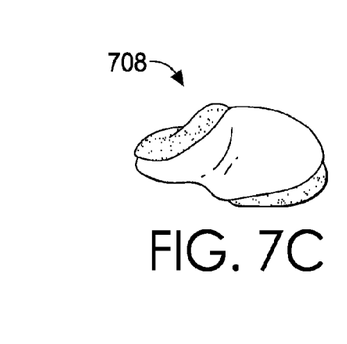
Figure 7D:
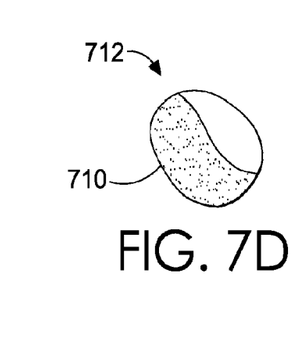
Figure 7E:
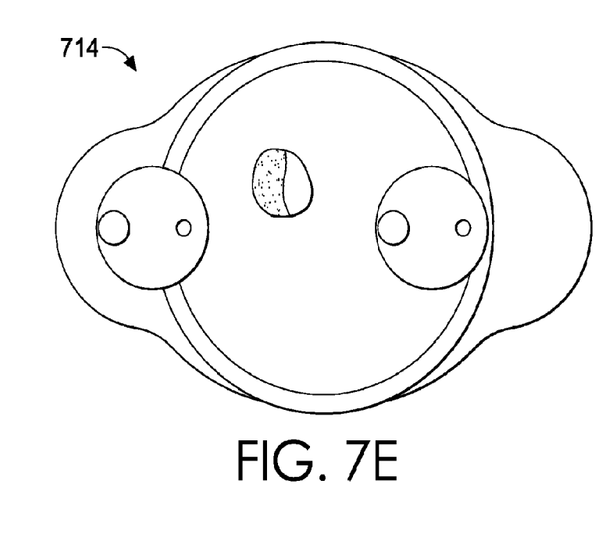
Figure 7F:
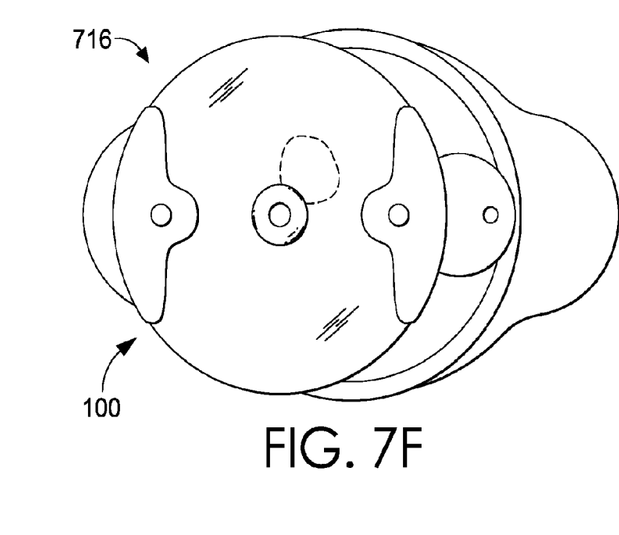

With additional reference to FIG. 5, the eccentric discs 104 are each a generally circular plate having a coupling 140 to the leg 130 along a bottom side thereof and a pin 142 disposed on a top side thereof. In an embodiment the eccentric discs 104 have any desired shape. The coupling 140 and the pin 142 are located near opposite edges of the disc 104, e.g. near opposite ends of a line drawn along a diameter of the disc 104. In embodiments, the coupling 140 and pin 142 are configured in any desired positions on the eccentric discs 104 in which the pin 142 is not coaxially aligned with the coupling 140. The pin 142 provides a removable coupling to the upper platen 106.

With continued reference to FIGS. 1-5, the upper platen 106 is a generally circular plate having a pair of apertures 144 and associated coupling apparatus 146 disposed near opposite edges thereof. The apertures 144 are located in a bottom surface 148 of the platen 106 and are configured to simultaneously align with the pins 142 on both of the eccentric discs 104. The coupling apparatus 146 includes a pair of jaws 147 that engage a depression (not shown) in the side of the pin 142 when inserted into the aperture 144, however any known coupling apparatus might be employed. The coupling apparatus 146 and the pins 142 provide a rotatable coupling between the eccentric discs 104 and the upper platen 106. An upper surface 150 of the platen 106 includes a handle 152 extending therefrom and a pair of release buttons 154 that correspond with each of the coupling apparatus 146 and apertures 144. The handle 152 is rotatably coupled to the upper platen 106.

With additional reference now to FIGS. 6-9, operation of the bead-forming apparatus 100 to produce a double cone bead 156 is described in accordance with embodiments of the invention. As depicted at 700 in FIG. 7, portions 702 and 704 of two differently colored modeling materials are selected. In an embodiment, any number of modeling materials, including a single modeling material, is used. As depicted at 706, the portions 702 and 704 are pressed together and may be twisted, folded, or otherwise formed as shown at 708. The combined two portions 702/704 might be formed into a generally spherical shape or plug 710 as depicted at 712 but, such is not required. The plug 710 is placed on top of the base 102 as shown at 714. The upper platen 106 is coupled to the eccentric discs 104 by inserting the pins 142 into the apertures 144 and engaging the coupling apparatus 146, as depicted at 816 and FIG. 8A.

Figure 8A:
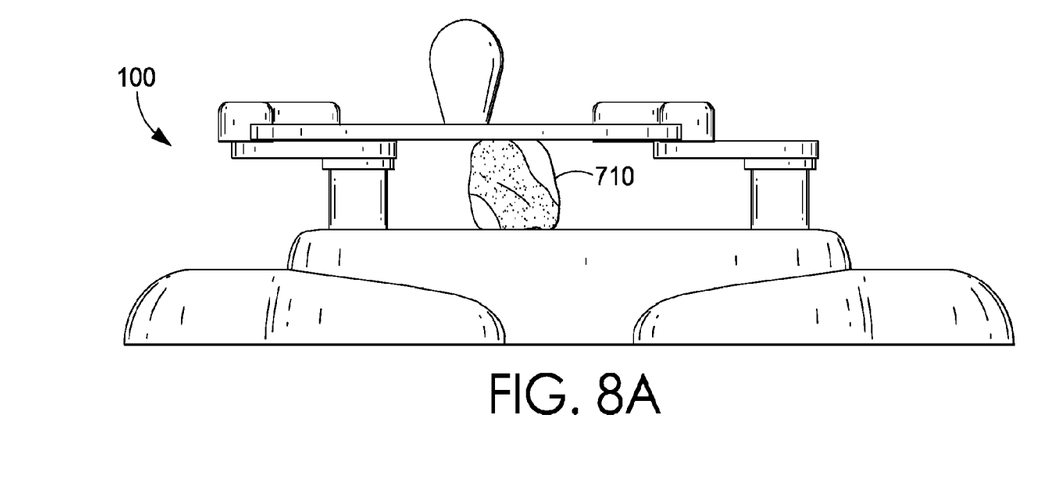
FIGS. 8A and B are side elevational views of the bead-forming apparatus depicted in FIG. 1 with the modeling materials of FIG. 7 disposed therein in accordance with an embodiment of the invention.
Figure 8B:
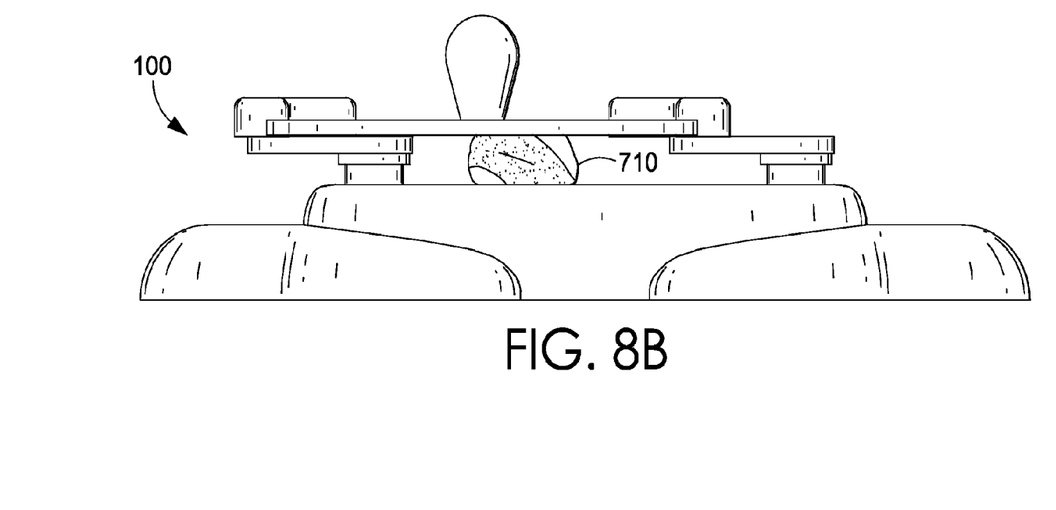

The upper platen 106 is depressed toward the base 102 thereby contacting and at least partially compressing the plug 710, as depicted in FIG. 8B. Depressing the upper platen 106 slides the legs 130 through the apertures 126 compressing the springs 128 between the first end 136 of the legs and the base plate 108.

The upper platen 106 is moved along a circular path as depicted in FIG. 6. The upper platen 106 does not rotate with respect to the base 102 but rather, is translated through the circular path as defined by the eccentric discs 104. Movement of the upper platen 106 rotates the eccentric discs 104 about their couplings 140 with the legs 130. This rotation further rotates the legs 130 and thus the gears 112 and 116. The rotation of the eccentric discs 104 and the legs 130 with respect to one another is maintained in synchronization by the gears 112, 114, and 116. As such, rotation of one eccentric disc 104 or leg 130 equally rotates the other eccentric disc 104 and leg 130 even without engagement of the upper platen 102.

Figure 1:
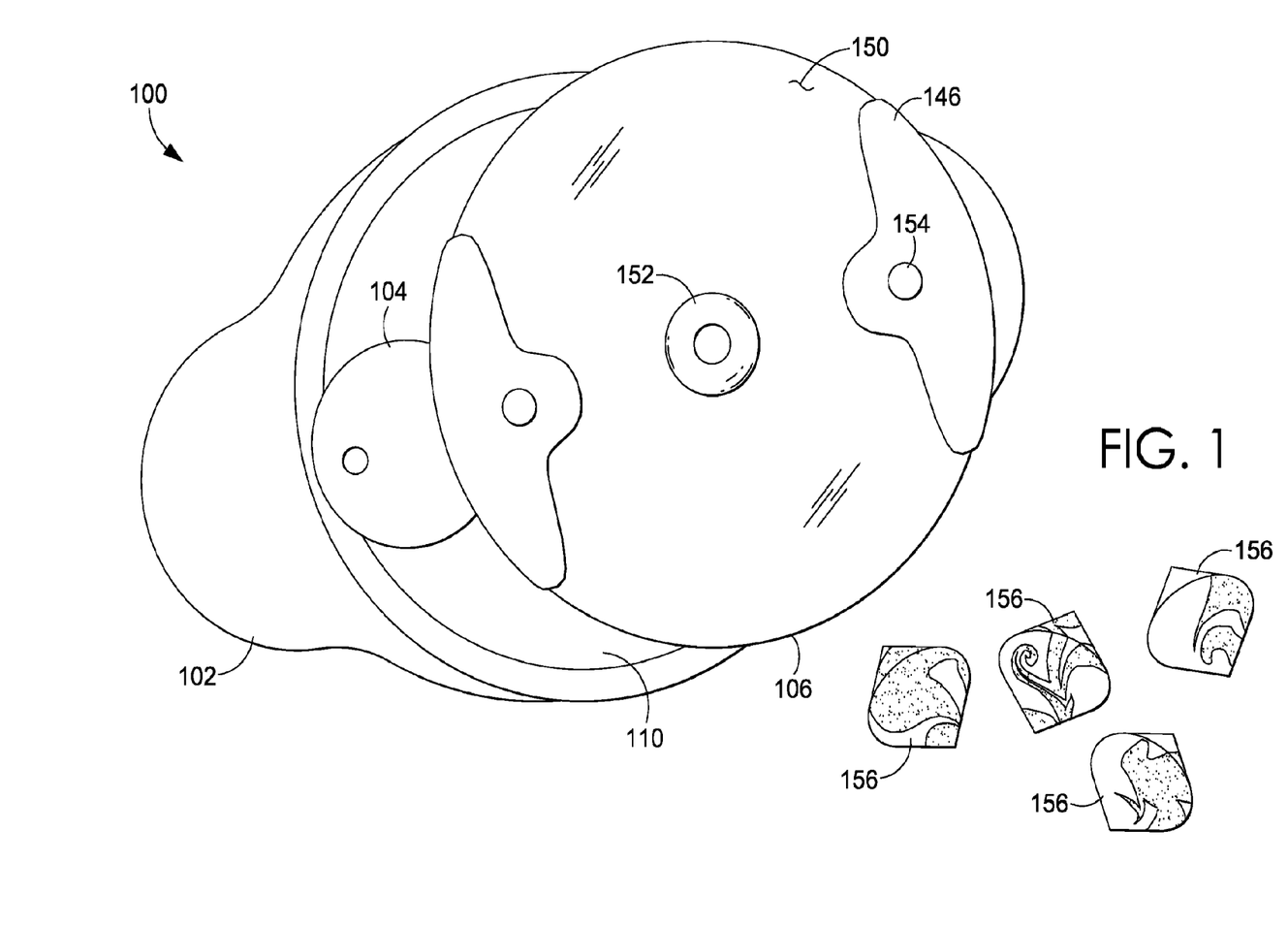
FIG. 1 is a top view of a bead-forming apparatus and a number of beads made thereby in accordance with an embodiment of the invention.
Figure 2:
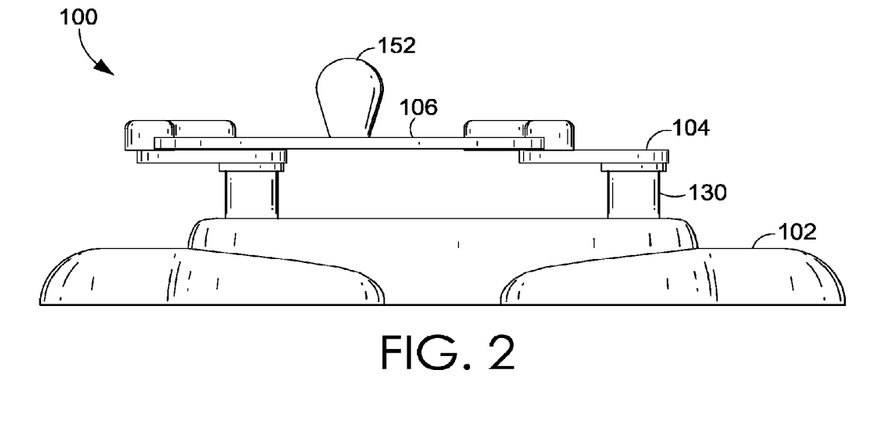
FIG. 2 is an elevational view of the bead-forming apparatus depicted in FIG. 1.
Figure 3:
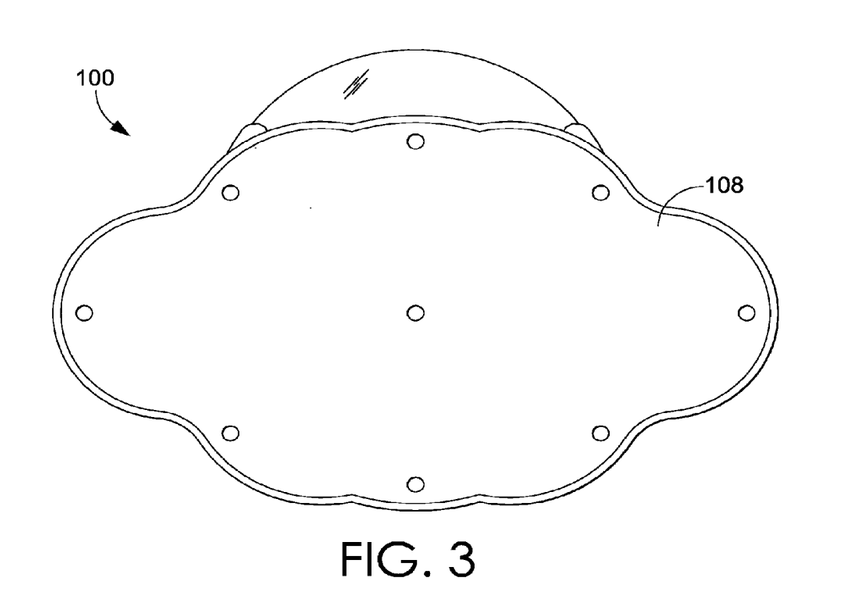
FIG. 3 is a bottom view of the bead-forming apparatus depicted in FIG. 1.
Figure 4:
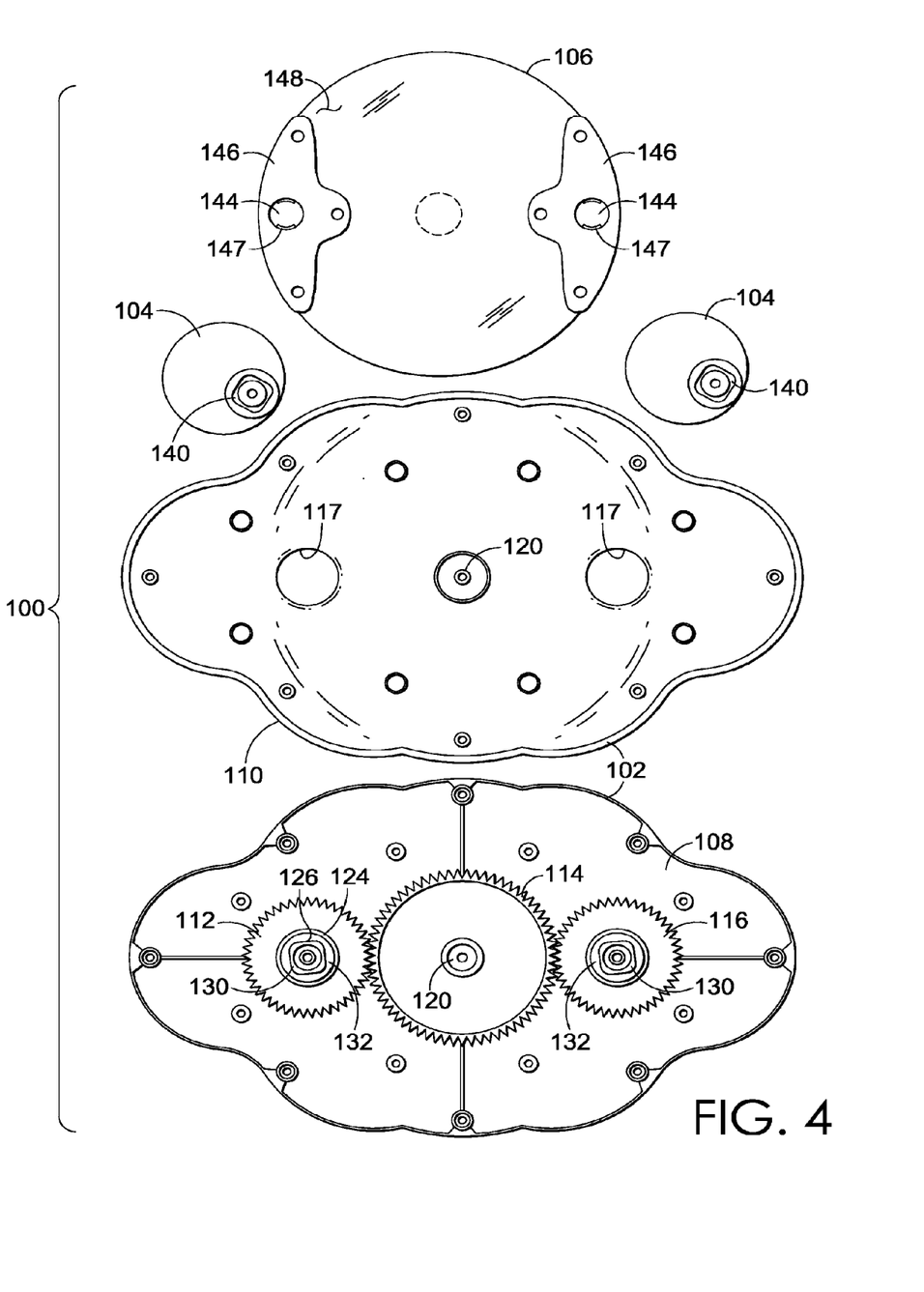
FIG. 4 is a view of components of the bead-forming apparatus depicted in FIG. 1 in a partially dismantled condition.
Figure 9:
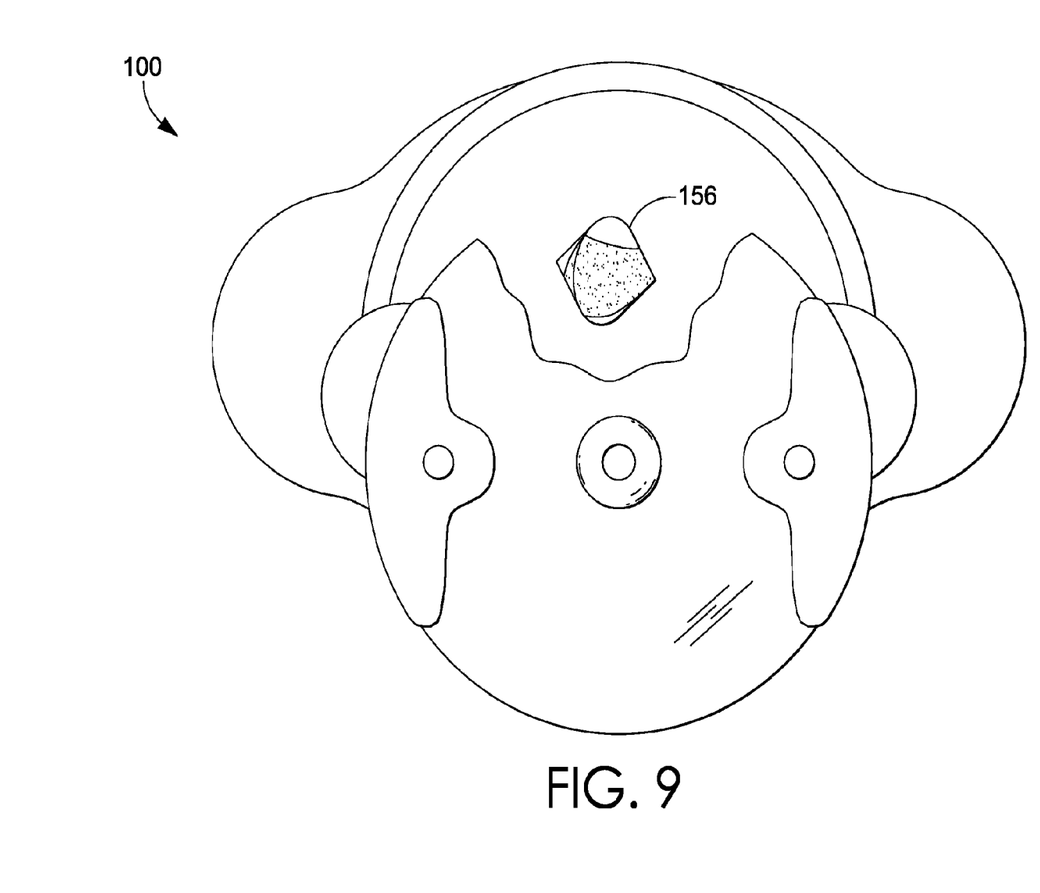
FIG. 9 is a top plan view of the bead-forming apparatus depicted in FIG. 1 with the modeling materials of FIG. 7 formed into a double cone bead in accordance with an embodiment of the invention.

Movement and depression of the upper platen 106 continues until a desired form is produced from the plug 710, as depicted in FIG. 9. The amount of depression of the upper platen 106 may be slowly reduced during movement of the upper platen 106 to allow formation of the plug 710 into the double cone bead 156 as depicted in FIGS. 1 and 9. Alternatively, depression may be maintained while movement of the upper platen 106 is halted to produce a more organic, oblong, flattened form as desired.

In addition to producing the double cone bead 156, depression and movement of the upper platen 106 also produces swirling of the modeling materials 702 and 704 as depicted in FIG. 1. As such, an amount of depression and duration of movement of the upper platen 106 may be tailored to provide a desired amount of swirling of the modeling materials 702 and 704.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What claimed is:

1. A bead-forming apparatus comprising:
   a base having a pair of apertures in a top surface;
   a pair of eccentric elements each having a first side and a second side;
   a pair of legs each having a first end and a second end, the first ends extending through a respective one of the apertures in the top surface of the base and attaching to the first side of a respective one of the eccentric elements;
   a pair of first gears disposed internal to the base, each having a projection extending from a side surface thereof and having an aperture therethrough the aperture being configured to slideably retain the second end of a respective one of the legs therein and to couple the gear and the leg in rotation about a common central axis;
   one or more second gears disposed internal to the base and providing mechanical connection between the pair of gears; and
   a platen removeably and rotatably coupled to the second side of the pair of eccentric elements.

2. The bead-forming apparatus of claim 1, wherein the base includes a base platen disposed on the top surface at least between the pair of apertures, the base platen comprising a substantially flat surface.

3. The bead-forming apparatus of claim 1, wherein the pair of eccentric elements each include a pin extending from the second side and disposed opposite the center of the eccentric element from a point at which one of the legs is attached.

4. The bead-forming apparatus of claim 3, wherein the platen includes a pair or releasable couplings that accept and rotatably couple to the pins of the eccentric elements.

5. The bead-forming apparatus of claim 4, wherein the releasable couplings include a release button that is depressed to decouple from the pins.

6. The bead-forming apparatus of claim 1, wherein the pair of first gears are mechanically coupled by a single central gear.

7. The bead-forming apparatus of claim 1, wherein the aperture in each of the first gears includes a cylindrical portion having a circular cross-section adjacent to a bottom surface of the base and a polygonal portion having a polygonal cross-section distal to the bottom surface.

8. The bead-forming apparatus of claim 7, wherein each of the legs includes an annular flange at or adjacent to the second end, the annular flange being accepted within the cylindrical portion of the respective first gear and obstructing passage of the second end of the leg through the polygonal portion of the respective first gear.

9. The bead-forming apparatus of claim 7, further comprising:
a coil spring disposed within the cylindrical portion of each of the first gears between the bottom surface of the base and the second ends of the legs disposed in each of the first gears.

10. The bead-forming apparatus of claim 1, wherein the base includes a pair of axels disposed therein, each axel being accepted within a hollow in the second ends of the legs.

11. The bead-forming apparatus of claim 1, further comprising:
a plug of moldable material disposed between the top surface of the base and the platen.

12. The bead-forming apparatus of claim 11, wherein the plug of moldable material is formed into a double-cone bead.

13. The bead-forming apparatus of claim 1, wherein the pair of first gears and the one or more second gears maintain a rotational orientation between the pair of eccentric elements.

14. The bead-forming apparatus of claim 1, wherein the pair of legs are depressible into the base.

15. A bead-forming apparatus comprising:
a base having a pair of apertures in a top surface;
a pair of eccentric elements each having a first side and a second side;
a pair of legs each having a first end and a second end, the first ends extending through a respective one of the apertures in the top surface of the base and attaching to the first side of a respective one of the eccentric elements, the second ends including an annular flange;
a pair of first gears disposed internal to the base, each having a projection extending from a side surface thereof and having an aperture therethrough the aperture having a cylindrical portion with a circular cross-section and a polygonal portion with a polygonal cross-section, the cylindrical portion slideably accepting the annular flange on the second end of the leg and the polygonal portion obstructing passage of the annular flange through the aperture, the leg and the polygonal portion having corresponding cross-sectional shapes that couple the gear and the leg in rotation about a common central axis;
one or more second gears disposed internal to the base and providing mechanical connection between the pair of gears; and
a platen removeably and rotatably coupled to the second side of the pair of eccentric elements.

16. The bead-forming apparatus of claim 15, wherein the pair of first gears and the one or more second gears maintain a rotational orientation between the pair of eccentric elements.

17. The bead-forming apparatus of claim 15, wherein the pair of legs is depressible into the base.

18. The bead-forming apparatus of claim 15, further comprising a pair of coil springs, each of the coil springs being disposed between the second end of a respective one of the legs and a bottom surface of the base, the pair of coil springs providing a normally extended position to the pair of legs.

19. A method for producing a double-cone bead from a moldable material, the method comprising:
providing a bead-forming apparatus that includes
a base having a pair of apertures in a top surface;
a pair of eccentric elements each having a first side and a second side;
a pair of legs each having a first end and a second end, the first ends extending through a respective one of the apertures in the top surface of the base and attaching to the first side of a respective one of the eccentric elements;
a pair of first gears disposed internal to the base, each having a projection extending from a side surface thereof and having an aperture therethrough the aperture being configured to slideably retain the second end of a respective one of the legs therein and to couple the gear and the leg in rotation about a common central axis;
one or more second gears disposed internal to the base and providing mechanical connection between the pair of gears; and
a platen removeably and rotatably coupleable to the second side of the pair of eccentric elements;
forming a portion of one or more moldable materials into a plug;
placing the plug onto the base between the apertures;
coupling the platen over the plug and to the pair of eccentric elements; and
translating the platen along a circular path defined by rotation of the pair of eccentric elements about their respective legs.

20. The method of claim 19, further comprising:
depressing the platen toward the base to contact and compress the plug against the base.

\* \* \* \* \*